United States Patent
Saito et al.

[11] Patent Number: 5,968,661
[45] Date of Patent: Oct. 19, 1999

[54] STEEL SHEET FOR HEAT-SHRINK BAND

[75] Inventors: Ichiro Saito, Kanagawa; Shiro Kenmotsu, Saitama; Tomio Aoki, Kanagawa; Kunikazu Tomita; Yasuyuki Takada, both of Hiroshima, all of Japan

[73] Assignees: Sony Corporation; NKK Corporation, both of Japan

[21] Appl. No.: 08/881,467

[22] Filed: Jun. 24, 1997

[30] Foreign Application Priority Data

Jun. 28, 1996 [JP] Japan ................................. 8-169000

[51] Int. Cl.[6] .................................................. B32B 15/04
[52] U.S. Cl. ..................... 428/457; 428/34.9; 428/35.1; 428/192; 428/212; 428/913; 348/821; 348/822; 348/824; 148/570; 148/579; 75/507
[58] Field of Search ..................................... 428/457, 212, 428/34.9, 35.1, 35.2, 57, 192, 913; 348/821, 822, 824; 420/8; 164/91; 148/570, 579; 75/507; 29/6.1

[56] References Cited

U.S. PATENT DOCUMENTS

| 5,216,513 | 6/1993 | Swank | 358/246 |
| 5,347,367 | 9/1994 | Swank | 348/822 |
| 5,606,377 | 2/1997 | Swank | 348/821 |

*Primary Examiner*—Deborah Jones
*Assistant Examiner*—Abraham Bahta
*Attorney, Agent, or Firm*—Rader, Fishman & Grauer; Ronald P. Kananen

[57] ABSTRACT

A steel sheet for a heat-shrink band, which is to be thermally expanded and fitted over the outer periphery of the panel portion of a cathode ray tube, which has at least a 20% elongation at an ambient temperature and at least a 40 kg/mm$^2$ stress of yielding point after the heating and cooling, in particular one comprised by a dual phase cold rolled steel sheet comprising a ferrite phase and a martensite phase or a cold rolled steel sheet containing a retained austenite.

9 Claims, 5 Drawing Sheets

STEEL SHEET FOR HEAT-SHRINK BAND

BACKGROUND OF THE INVENTION

1. Field of the Invention

The present invention relates to a steel sheet for a heat-shrink band.

2. Description of the Related Art

In a color cathode ray tube (CRT), in order to have the electrons emitted from an electron gun strike the fluophors on an inner surface of a panel portion of the CRT so as to cause them to emit the desired light, the interior of the tube comprising the panel portion and a funnel portion joined to this is evacuated to a high vacuum of about $1.0 \times 10^{-7}$ Torr so as to prevent the flight of the electrons from being hindered by any gas remaining in the inside. When the tube is evacuated, the panel surface is deformed to a concave shape in comparison with the state before evacuating the interior of the tube due to the air pressure.

In this state, the positions of the fluophors provided inside the panel portion shift in comparison with the state before the evacuation of the interior of the tube, therefore the landing points of the electron beams relative to the fluophor panel shift, so color deviation is caused. Further, if the panel surface is deformed to the concave state, there is a risk of implosion.

In order to prevent this, a heat-shrink band obtained by shaping a sheet of steel into a band is provided around the periphery of the panel portion. The inner circumferential length of the band at an ambient temperature becomes slightly smaller than the length of the periphery of the panel portion.

In order to fit this heat-shrink band around the periphery of the panel portion, the band is first heated to about 500° C. to cause it to expand, then the band is fit over the periphery of the panel portion and simultaneously rapidly cooled by means of blowing air etc. This rapid cooling causes the heat-shrink band to shrink. The deformation of the panel surface due to the air pressure is corrected by the resultant tension. As this heat-shrink band, conventionally use is made of a sheet of steel material having a stress of yielding point of about 24 kg/mm$^2$ (elongation of 30%) in view of the balance of the formability and tension.

However, a heat-shrink band has to provide a tension large enough to correct the deformation of the panel surface due to the air pressure as described above. With conventional materials, there has been the problem that they are heavy in weight—over 700 g even for a 21 inch cathode ray tube. If it is attempted to use a high tensile strength steel sheet having a high stress of yielding point as the heat-shrink band in order to solve such a problem, there is the problem in that with sheets of steel, there is the generally the tendency that the higher the stress of yielding point rises, the smaller the elongation becomes (for example about 10%), so the formability when shaping the heat-shrink band by the press process or the like becomes remarkably poor and cracks or splits will occur in the bent part.

In the above description, the heat-shrink steel band for the CRT was discussed, the above disadvantages can be applied to other objects.

SUMMARY OF THE INVENTION

An object of the present invention is to provide a heat-shrink band which has a light weight, corrects the deformation of an object, such as a panel of a cathode ray tube (CRT) due to the air pressure, effectively prevents implosion of the cathode ray tube, can suppress the color deviation, and in addition is excellent also in formability.

To attain the above object, the steel sheet for a heat-shrink band according to the present invention is a material for constituting a heat-shrink band, which is to be thermally expanded and fitted over the outer periphery of the panel portion of a cathode ray tube, which has at least a 20% elongation at an ambient temperature and at least a 40 kg/mm$^2$ stress of yielding point after the heating and cooling.

As the steel sheet which can be concretely used as the material for a heat-shrink band according to the present invention, a dual phase cold rolled steel sheet comprising a ferrite phase and a martensite phase, a cold rolled steel sheet containing a retained austenite, etc. can be exemplified.

The present inventors took note of the heat treatment process referred to as the "heat-shrinkage" when attaching the heat-shrink band to the panel portion of the cathode ray tube and discovered that by using a sheet of steel material by which a 20% or more elongation can be secured at an ambient temperature and in addition by which the stress of yielding point is increased by the heat treatment at the time of the heat-shrink process as the steel sheet for a heat-shrink band, it is possible to achieve both a high stress of yielding point and formability and thereby completed the present invention.

Namely, the steel sheet for a heat-shrink band according to the present invention is a sheet of steel material where the stress of yielding point is not so large at an ambient temperature, a 40 kg/mm$^2$ or more stress of yielding point is obtained by the heating at the time of the heat-shrink process, and there is 20% or more elongation at an ambient temperature. Therefore, in the state before heating, the elongation is large and the formability is excellent. Accordingly, the steel sheet can be easily processed to various shapes required as the heat-shrink band. After attaching the heat-shrink band to the outer periphery of the panel by the heat-shrink process, since heat treatment was applied to the heat-shrink band, the stress of yielding point thereof is increased up to 40 kg/mm$^2$ or more. As a result, the sectional area of the heat-shrink band for obtaining the tension required for the heat-shrink band can be made smaller in comparison with the conventional case and a reduction of the weight of the heat-shrink band can be achieved.

Further, in the present invention, even if the weight of the heat-shrink band is reduced, the stress of yielding point of the material after the heat-shrink process is sufficiently high, therefore the tension required for the heat-shrink band can be sufficiently held, the deformation of the panel of the cathode ray tube due to the air pressure is corrected, the implosion of the cathode ray tube is effectively prevented, and color deviation can be suppressed.

BRIEF DESCRIPTION OF THE DRAWINGS

These and other objects and features of the present invention will become clearer from the following description of the preferred embodiment given with reference to the appended drawings, in which.

DESCRIPTION OF THE PREFERRED EMBODIMENTS

Figure 1:
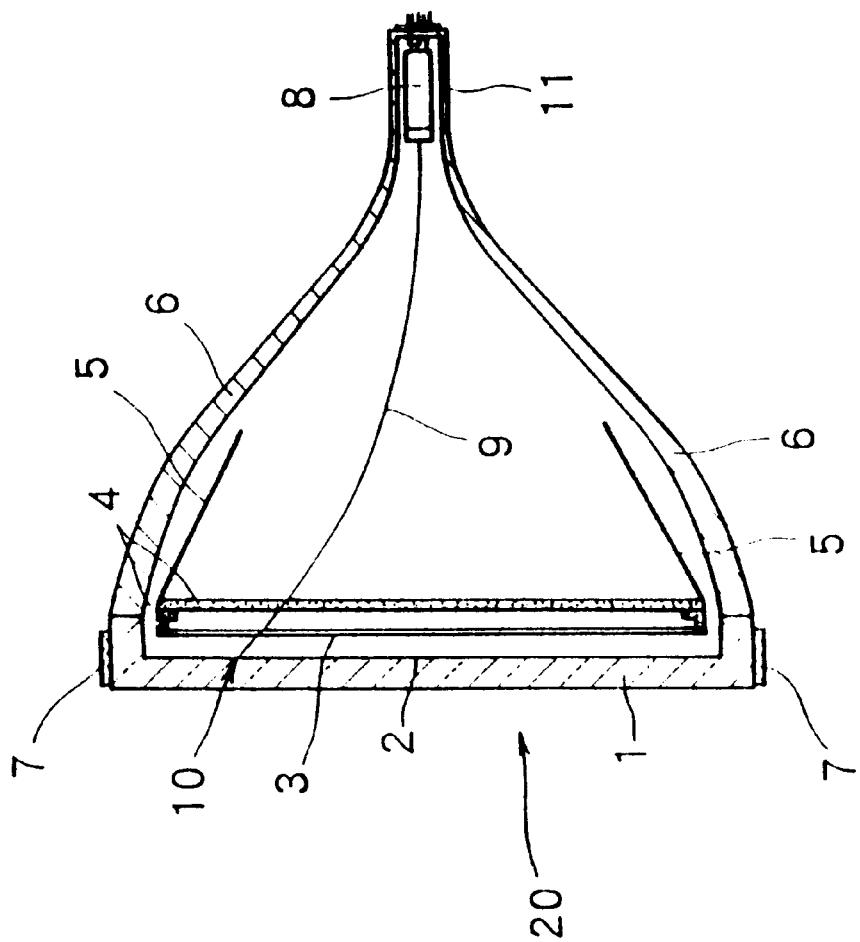
FIG. 1 is a schematic sectional view of a cathode ray tube (CRT) according to an embodiment of the present invention.

Below, a detailed explanation will be made of a steel sheet for a heat-shrink band according to the present invention based on an embodiment shown in the drawings.

Before the explanation of the steel sheet for a heat-shrink band, an explanation will be given of a cathode ray tube (CRT).

In the specification, the term "steel" involves steel, iron and other material concerning thereto.

As shown in FIG. 1, a CRT 20 has a panel portion 1 on which the image is displayed and a funnel portion 6. These are melt-fused together by a frit glass (solder glass). A fluophor panel 2 is formed on the inner surface of the panel portion 1. An aperture grill 3 is mounted inside of the fluophor panel 2. The aperture grill 3 is bonded to the front surface of a frame 4, and an internal magnetic shield 5 is mounted on the back surface side of the frame 4.

A neck portion 11 is formed at a rear end of the funnel portion 6, and an electron gun 8 is positioned inside it. An electron beam 9 from the electron gun 8 passes through a slit of the aperture grill 3 for selection of the color. The fluophor panel 2 is made to emit the light of the desired color at the landing point 10 on the fluophor panel 2.

The interior of the tube comprising the panel portion 1 and the funnel portion 6 joined with it is evacuated to a high vacuum of about $1.0 \times 10^{-7}$ Torr so that the flight of the electrons is not inhibited by gas remaining in the inside. In order to obtain a high degree of vacuum for the internal portion of this CRT 20, the air is evacuated from the neck portion 11 of the funnel portion 6. At this time of evacuation, in order to prevent the deformation of the front surface of the panel portion 1 and to protect the panel portion 1, the heat-shrink band 7 is fitted over the outer periphery of the panel portion 1. Note that usually the heat-shrink band is attached after the evacuation. Further, the heat-shrink band 7 corrects the deformation of the panel 1 caused by the difference between the vacuum pressure in the tube and air pressure outside, corrects the deviation of the landing point 10, and thereby prevents the color deviation.

Figure 2:
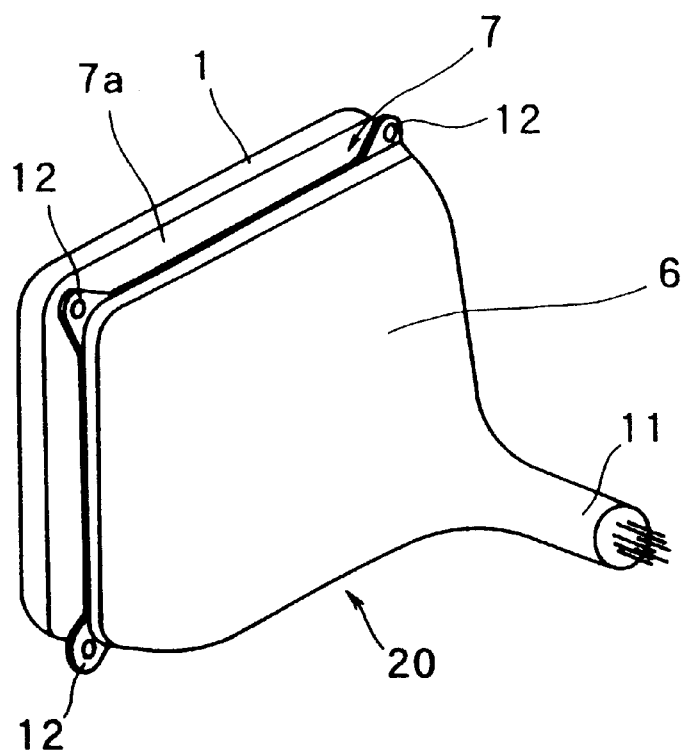
FIG. 2 is a perspective view seen from the back surface of the CRT shown in FIG. 1.
Figure 3:
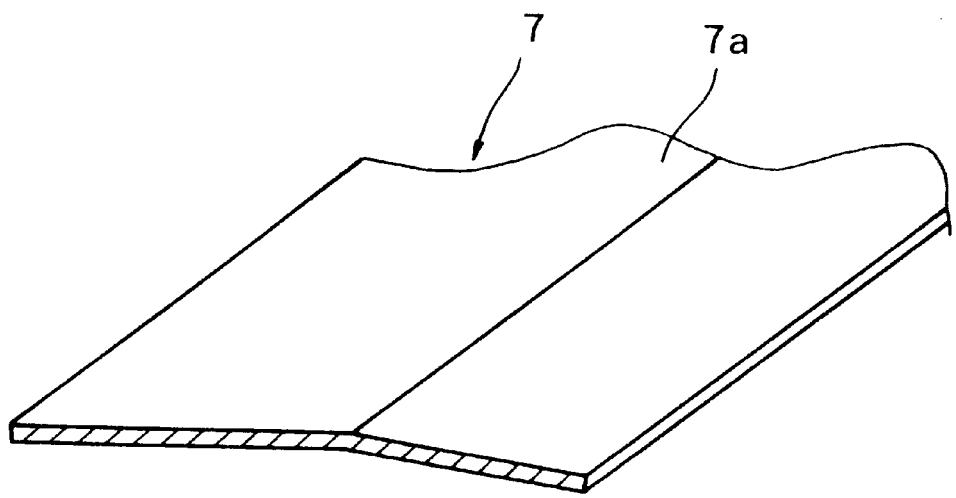
FIG. 3 is a perspective view of principal parts of the heat-shrink band shown in FIGS. 1 and 2.

The heat-shrink band 7 has a band body 7a to be wound around the panel portion 1 as shown in FIGS. 2 and 3. This band body 7a is constituted by bending the sheet of steel material into a rectangular shape. The two ends of the band body 7a are connected to each other via for example a plate. To the band body 7a, as shown in FIG. 2, a CRT holder 12 is joined by a spot welding or the like at for example four positions along the longitudinal direction thereof. The CRT holder 12 is for affixing the CRT 20 to the casing, frame, etc. of the television set. It is also possible to shape this CRT holder 12 integrally with the band 7 and shape this by a pressing etc.

In the present embodiment, the band body 7a of the heat-shrink band 7 is constituted by a steel sheet with an elongation at an ambient temperature of 20% or more and a stress of yielding point after heating and cooling of 40 $kg/mm^2$ or more. As such a steel sheet, a dual phase cold rolled steel sheet comprising a ferrite phase and a martensite phase, or a cold rolled steel sheet containing a retained austenite can be exemplified.

In the band body 7a of the heat-shrink band 7 according to the present embodiment, since the stress of yielding point is not so large at the an ambient temperature, a stress of yielding point of 40 $kg/mm^2$ or more is obtained by the heating at the heat-shrink process, and the elongation at an ambient temperature is 20% or more, the elongation is large and the formability is excellent in the state before the heating. Accordingly, the material can be easily processed into the various shapes required as the heat-shrink band 7. Then, after attaching the heat-shrink band 7 to the outer periphery of the panel portion 1 by the heat-shrink process, since heat treatment was applied to the heat-shrink band 7, the stress of yielding point thereof is increased up to 40 $kg/mm^2$ or more. As a result, the sectional area of the heat-shrink band 7 for obtaining the tension required for the heat-shrink band 7 can be made smaller in comparison with the conventional case and thus a reduction of weight of the heat-shrink band 7 can be achieved.

Further, in the present embodiment, even if the weight of the heat-shrink band 7 is reduced, the stress of yielding point of the material after the heat-shrink process is sufficiently high, therefore the tension required for the heat-shrink band 7 can be sufficiently held, the deformation of the panel of the CRT 20 due to the air pressure is corrected, the implosion of the CRT 20 is effectively prevented, and the color deviation can be suppressed.

Note that, the present invention is not limited to the above embodiment and can be modified in various ways within the range of the present invention.

For example, the steel sheet for a heat-shrink band with which 20% or more elongation can be secured at an ambient temperature and in addition with which the stress of yielding point is increased by the heat treatment at the heat-shrink process is not limited to the above steel sheet. Any steel sheets having 20% or more elongation at an ambient temperature and a stress of yielding point of 40 $kg/mm^2$ or more after heating and cooling can be used as the material for a heat-shrink band according to the present invention.

Below, more detailed examples of the present invention will be explained in comparison with a comparative example (conventional example), but the present invention is not limited to these examples.

EXAMPLE 1 AND COMPARATIVE EXAMPLE 1

The length of the periphery of the panel portion, that is, the panel circumferential length, of a 21 inch CRT is 1541.6 mm when the degree of vacuum in the tube is set to $1.0 \times 10^{-7}$ Torr. A conventional heat-shrink band (Comparative Example 1) using a material having a stress of yielding point of 24 $kg/mm^2$ has a thickness of 1.6 mm and a width of 35 mm. The amount of strain when this band is heated, attached to the outer periphery of the panel, and rapidly cooled is about 0.4% which is within the plasticity range of a stress-strain curve. From this, the tension of the band can be estimated by multiplying the sectional area of the band by the stress of yielding point, that is, is about 1344 kg. Such a heat treatment process of heating and rapid cooling is referred to as the heat-shrink process.

Figure 4:
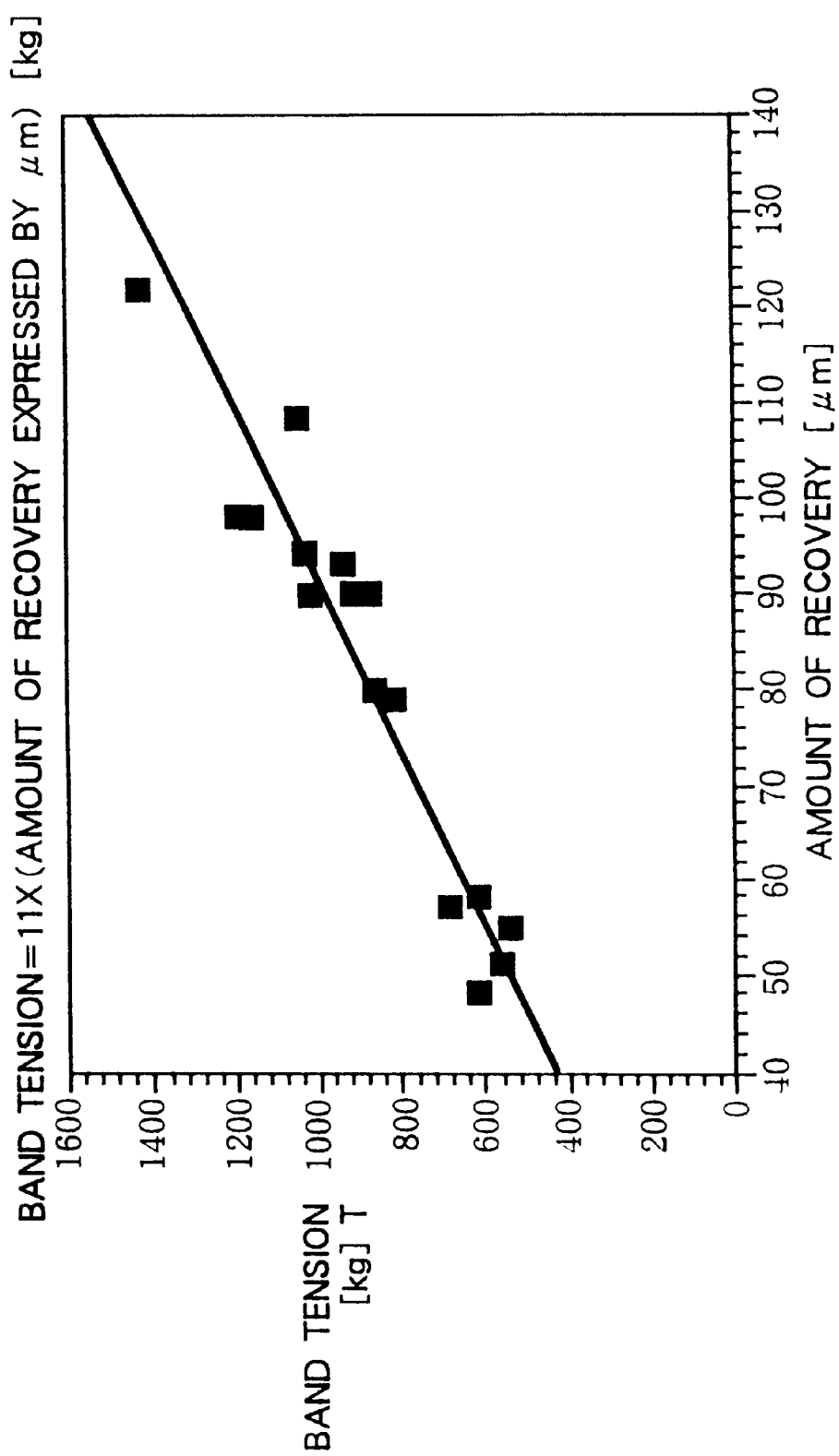
FIG. 4 is a graph showing a relationship of an amount of recovery and a band tension.

On the other hand, the performance of a heat-shrink band is evaluated by the quantity of the "amount of recovery". The amount of recovery is defined as the position of the panel surface after fitting the band as measured against the position of the panel surface before fitting the heat-shrink band. In a usual CRT, the standard amount of recovery is 120 μm±30 μm. FIG. 4 is a graph showing the measurement of the relationship of the amount of recovery and the tension of the heat-shrink band.

As shown in FIG. 4, the relationship of the amount of recovery R and the tension T of the heat-shrink band is substantially a straight line. The following relationship stands:

$$T(\text{kg}) = 11 \times R(\mu\text{m}) \quad (1)$$

Also the tension of the heat-shrink band according to Comparative Example 1 becomes 1320 kg if an average value 120 μm of the standard amount of recovery is assigned in the above equation (1) which substantially satisfies the above equation (1).

Next, an explanation will be made of the heat-shrink band according to Example 1 in which a material having the same density as that of the material of the heat-shrink band according to Comparative Example 1 is used, the thickness of the band is halved (0.8 mm), and the weight is halved.

Figure 5:
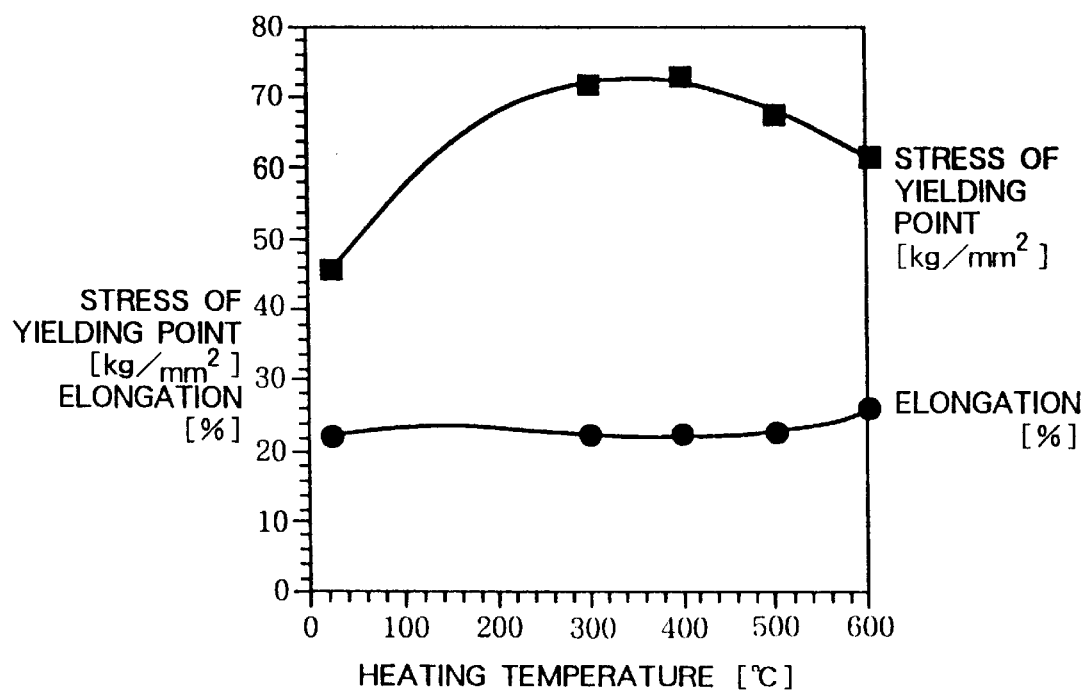
FIG. 5 is a graph showing a relationship of a heating temperature and a stress of yielding point of the material for a heat-shrink band according to the example of the present invention.

The thermal expansion coefficient of a sheet of steel is substantially constant and does not depend upon its composition, rolling, or heat treatment. It is $1.33 \times 10^{-5}/°C$. within a range of from 0 through 500° C. The stress of yielding point of a sheet of steel starts to fall when the heating temperature becomes 400 to 500° C. or more as shown in FIG. 5 and rapidly falls when the heating temperature exceeds 600° C. This tendency is slightly different according to the composition, heat treatment, rolling conditions, etc., but is a general characteristic in a sheet of steel. For this reason, the heating temperature in the heat-shrink process is preferably 600° C. or less.

In the present example, the heating temperature of the heat-shrink process was set to 500° C. for safety reasons. At this time, if calculating the inner circumferential length of the heat-shrink band before heating, that is, the minimum value $L_{min}$ (mm) of the band circumferential length, it can be calculated as follows:

$$L_{min} = 1541.6/(1 + 1.33 \times 10^{-5} \times 500) = 1531.4 \quad (2)$$

Anticipating error of the panel circumferential length and variations in fabrication and thereby giving some leeway to this value, the band circumferential length is set to 1537.9 mm. At this time, the amount of strain δ (%) after the heat-shrink process can be represented as follows from the panel circumferential length and the above value of the band circumferential length.

$$\delta = (1541.6 - 1537.9) \times 100/1537.9 = 0.24\% \quad (3)$$

If a tension equivalent to the tension of 1344 kg of the conventional heat-shrink band according to Comparative Example 1 is obtained, the desired amount of recovery can be obtained from the above equation (1) and the weight of the heat-shrink band can be halved.

On the other hand, the heat-shrink band 7 shown in FIGS. 2 and 3 is generally fabricated by pressing. In order to bend a sheet bent as shown in FIG. 3 by 90 degrees at the corner portion or shape the CRT holder 12 at the corner portion of the band 7 by pressing, the material of the heat-shrink band requires a considerably large elongation. In the material having a stress of yielding point of 24 kg/mm² according to Comparative Example 1, there is 40% or more elongation. As a result of experiments of bending by 90 degrees to a V-shape and other shaping and of actual fabrication tests of a heat-shrink band to study the elongation and formability within an elongation range of from 3 to 43%, the present inventors found that 20% or more elongation was necessary as the elongation of the material in order to enable processing such as pressing necessary for shaping the band without cracks or splits.

However, with a usual material, if the stress of yielding point after the heat treatment is large, the stress of yielding point before the heat treatment (at an ambient temperature) is also large and also the elongation at an ambient temperature is small. For this reason, if a sheet of steel having a large stress of yielding point is used as the heat-shrink band, the formability becomes remarkably poor and if a usual sheet of steel is used, a high stress of yielding point and formability (that is 20% elongation) cannot be simultaneously satisfied.

Therefore, as stated above, present inventors took note of the heat treatment process referred to as the "heat-shrinkage" and used a sheet of steel material by which a 20% or more elongation can be secured at an ambient temperature and in addition by which the stress of yielding point is increased by the heat treatment at the time of the heat-shrink process as the steel sheet for a heat-shrink band so as to achieve both a high stress of yielding point and formability and thereby completed the present invention.

Namely, in Example 1, a dual phase cold rolled steel sheet comprising a ferrite phase and a transformed phase consisting mainly of a martensite phase was used as the heat-shrink band. This steel sheet is fabricated for example by continuously annealing a cold rolled steel sheet having a thickness of 0.8 mm comprised of for example 0.09% by weight of C, 1.5% by weight of Si, and 1.7% by weight of Mn at 800° C., then cooling to 560° C. in the air, then quenching in water.

With this steel sheet, a high work hardening rate is obtained by establishing a suitable distribution of strain between the soft ferrite phase and the hard transformed phase at low temperature and 20% or more elongation can be secured.

Further, in this steel sheet, the stress of yielding point is not so high before the heat treatment (at an ambient temperature) due to the introduction of the mobile dislocation to the ferrite phase accompanying the production of the transformed phase at low temperature. This is also advantageous for the formability at an ambient temperature. When this steel sheet is subjected to the heat-shrink heat treatment, the mobile dislocation in the ferrite phase and the transformed phase at low temperature is fixed, therefore the stress of yielding point remarkably rises in comparison with that before the heat treatment and a 40 kg/mm² or more stress of yielding point is easily obtained.

FIG. 5 is a graph showing the relationship of the heating temperature and the stress of yielding point of the steel sheet used in Example 1. In this figure, the value measured near 20° C. is the value measured at a ambient temperature when not undergoing the heating and cooling process. As seen from this figure, in this material, there is 20% or more elongation near the ambient temperature at which the processing of the band is carried out. Also, the stress of yielding point is about 40 kg/mm². For this reason, the condition of the formability of the heat-shrink band can be satisfied.

Further, as shown in FIG. 5, it is seen that, when this material is subjected to a heating and cooling process at a heating temperature equivalent to that of the heat-shrink process, the stress of yielding point can be raised to about 70 kg/mm². In this way, by selecting an adequate material and combining this with the heat-shrink processing, it becomes possible to raise the stress of yielding point of the steel sheet. However, if the heat treatment temperature is too high, the amount of rise of the stress of yielding point becomes small or the stress will conversely be lowered. The reason for this can be considered to be the promotion of the thermal softening of the material (recovery, recrystallization, grain growth, and coarsening of the precipitate) together with the rise of the heat treatment temperature. Accordingly, in the case of a sheet of steel material, as seen also from FIG. 5, ½ of the melting point, that is about 600° C. corresponds to the thermal softening temperature. Accordingly, as mentioned above, the heating temperature of the heat-shrink process is preferably about 600° C. or less.

A heat-shrink band having the above circumferential length was fabricated by using a material having the characteristic shown in FIG. 5. This was fitted over a 21 inch CRT having the above panel circumferential length by the heat-shrink process, then was cut and the amount of recovery and the stress-strain characteristic was measured. The stress-strain characteristic is shown in FIG. 6.

Here, the thickness of the fabricated band was 0.8 mm and the width was 35 mm. Note that the distribution of the thickness and width of the band of the present example are only one example. The sectional area of the band can be further reduced by using a material having a further large stress of yielding point. The distribution of the thickness and the width can be freely changed based on the sectional area.

Figure 6:
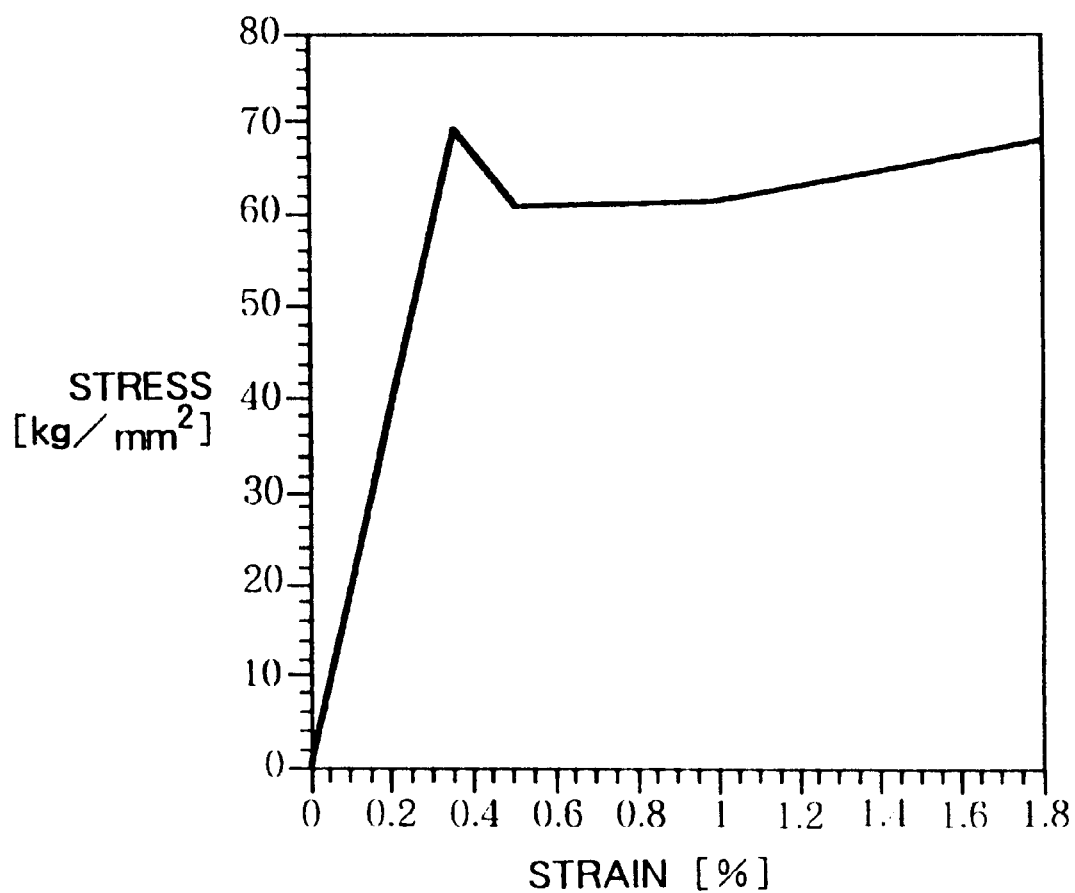
FIG. 6 is a graph showing a relationship of strain and stress of the material for a heat-shrink band according to the same example.

It is seen from the results of FIG. 6 that the stress of the band is 47.3 kg/mm² and the tension of the band becomes 47.3×0.8×35=1325 kg at the strain of the above equation (3).

From the relationship of the above equation (1), the amount of recovery at this time can be estimated as 120 μm. Also, in actual measurement, 120 through 130 μm was obtained as the amount of recovery. At this time, the weight of the heat-shrink band becomes about half of the conventional heat-shrink band having the stress of yielding point of 24 kg/mm² since the thickness of the band has become 0.8 mm.

From the above results, by using a sheet of steel material which has a stress of yielding point that is not so large at an ambient temperature but which increases in the stress of yielding point by the heating at the heat-shrink process to become 40 kg/mm² or more and which has a 20% or more elongation at an ambient temperature and by setting the heating temperature at the heat-shrink process at 600° C. or less, it is possible to use a material having a high stress of yielding point and to reduce the weight of the heat-shrink band.

In this example, a sheet of steel material in which the stress of yielding point after the heat-shrink process became 70 kg/mm² was used, but the effect of the reduction of weight can be obtained so far as the material has a 40 kg/mm² or more stress of yielding point after the heat-shrink process. So long as the stress of yielding point is 40 kg/mm² or more, it is possible to use a sheet of steel material of any composition in accordance with the degree of weight reduction desired.

EXAMPLE 2

In Example 2, as a sheet of steel material which has a stress of yielding point that is not so large at an ambient temperature but which increases in the stress of yielding point by the heating at the heat-shrink process to become 40 kg/mm² or more and which has a 20% or more elongation at an ambient temperature, a cold rolled steel sheet containing a retained austenite was used in place of the dual phase steel sheet comprising the ferrite phase and the martensite phase.

This steel sheet is comprised by a ferrite phase, a retained austenite phase, and a balance transformed phase at low temperature mainly comprised of a bainite phase and offers both a high elongation characteristic at an ambient temperature and a high stress of yielding point characteristic after the heat-shrink process. This mechanism by which this is obtained is considered to be that the high elongation characteristic at an ambient temperature is achieved by a high work hardening rate due to the TRIP of the retained austenite phase and that the high stress of yielding point after the heat-shrink process is achieved by the fixation of the mobile dislocation similar to the dual phase cold rolled steel sheet.

This steel sheet can be fabricated by annealing a cold rolled steel sheet having a thickness of 0.8 mm composed of for example 0.2% by weight of C, 1.5% by weight of Si, and 1.7% by weight of Mn at 800° C., then causing isothermal transformation in the bainite transformation zone of about 400° C.

This type of steel sheet is also a sheet of steel material where the stress of yielding point is not so large at an ambient temperature, gives a stress of yielding point of 40 kg/mm² by the heating at the heat-shrink process, and has an elongation at an ambient temperature of 20% or more, therefore can be preferably used as the heat-shrink band according to the present invention and has a similar action and effect as those of the heat-shrink band of the above Example 1.

As explained above, according to the present invention, by using a sheet of steel material which has a stress of yielding point that is not so large at an ambient temperature but which increases in the stress of yielding point by the heating at the heat-shrink process to become 40 kg/mm² or more and which has a 20% or more elongation at an ambient temperature and by setting the heating temperature at the heat-shrink process to 600° C. or less, the weight of the heat-shrink band can be reduced. As a result, this contributes also to the reduction of weight of the CRT.

Further, by reducing the weight, a reduction of the fabrication cost can be achieved since the cost of a sheet of steel material is determined according to weight.

Further, the sectional area of the heat-shrink band becomes smaller and the heat capacity becomes smaller, therefore the heating time at the heat-shrink process becomes shorter, the time for heat shrinking the band and fitting the same over the CRT can be shortened, and the processing costs of the fabrication of the CRT can be reduced.

The above description was made for a heat-shrink steel band for a CRT, but, the present invention is not limited to the application of the CRT, and thus a heat-shrink steel band of the present invention can be applied to a variety of objects other than the CRT.

What is claimed is:

1. A steel sheet for a heat-shrink band, which is to be thermally expanded and fitted over an object, said steel sheet having at least a 20% elongation at an ambient temperature and at least a 40 kg/mm² stress of yielding point.

2. A steel sheet for a heat-shrink band according to claim 1, comprising a dual phase cold rolled steel sheet comprising a ferrite phase and a martensite phase.

3. A steel sheet for a heat-shrink band according to claim 1, comprising a cold rolled steel sheet containing a retained austenite.

4. A steel sheet for a heat-shrink band according to claim 1, wherein said object is a panel portion of a cathode ray tube, and said steel sheet is thermally expanded and fitted over an outer periphery of said panel portion.

5. A steel sheet for a heat shrink band according to claim 1, comprising a dual phase cold rolled steel sheet which comprises a ferrite phase and a martensite phase.

6. A steel sheet for a heat shrink band according to claim 1, comprising a cold rolled steel sheet containing a retained austenite.

7. A steel sheet for a heat-shrink band according to claim 4, wherein said at least 40 kg/mm$^2$ stress of yielding point is reached following a heating and cooling process.

8. A steel sheet for a heat-shrink band according to claim 1, wherein said at least 40 kg/mm$^2$ stress of yielding point is reached following a heating and cooling process.

9. A heat-shrink band, which comprises:

a steel sheet in combination with an outer periphery of a panel portion of a CRT, said steel sheet having at least a 20% elongation at an ambient temperature and at least a 40 kg/mm$^2$ stress of yielding point, wherein said steel sheet is thermally expanded and fitted over an outer periphery of said panel portion of said CRT.

* * * * *